Patented June 19, 1951

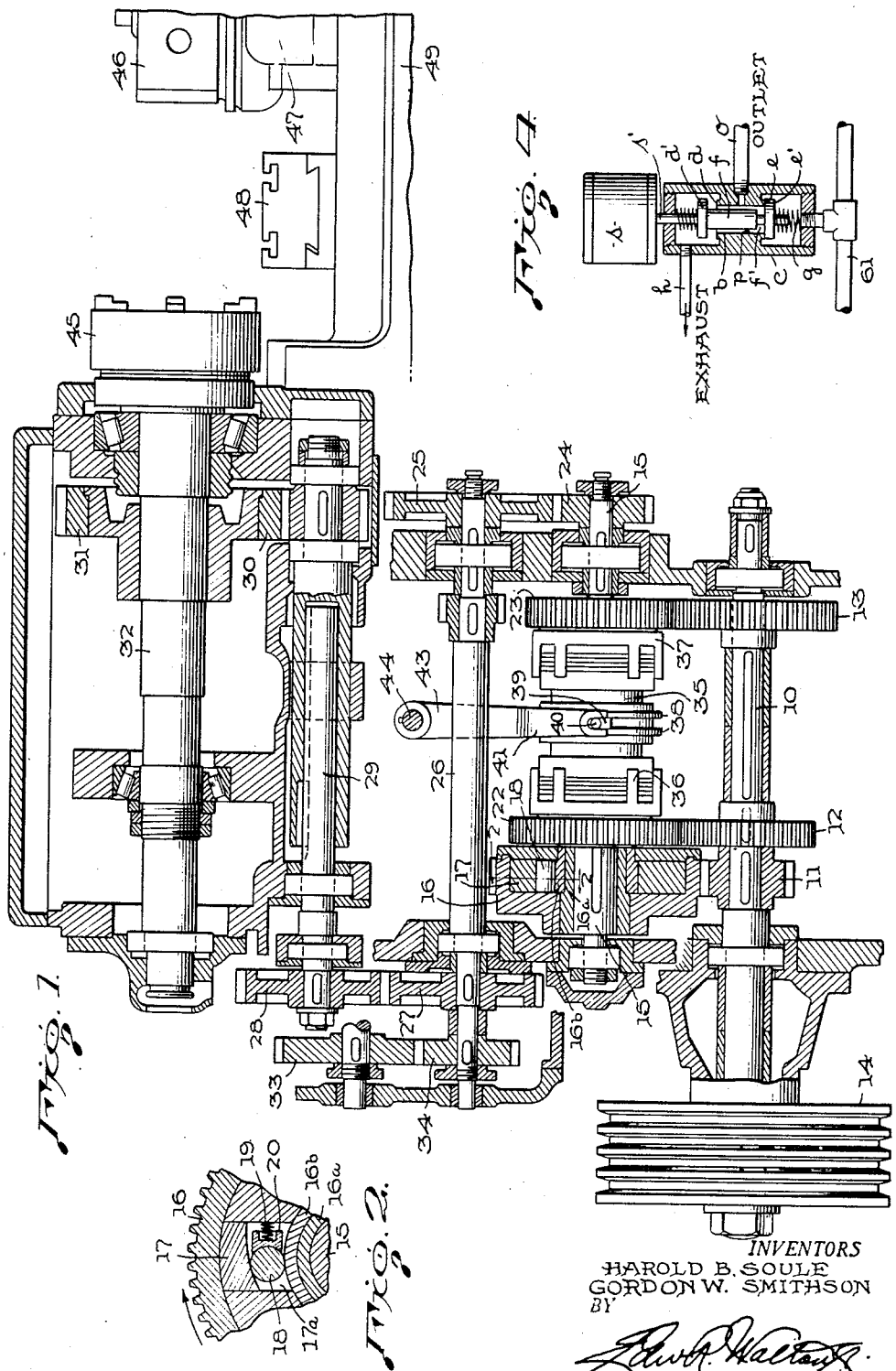

2,557,896

UNITED STATES PATENT OFFICE 2,557,896

CONTROL FOR CHANGE-SPEED MECHANISMS

Harold B. Soule, Barrington, and Gordon W. Smithson, Pawtucket, R. I., assignors to Niles-Bement-Pond Company, West Hartford, Conn., a corporation of New Jersey Application June 29, 1948, Serial No. 35,808

8 Claims. (Cl. 74—472)

This invention relates to an improved control means for change speed mechanism and more particularly relates to means for changing or shipping the speeds of an automatic turret lathe.

In automatic turret lathes the tool or turret-slide feed and spindle speed shipping is usually automatically controlled by dogs on a rotating dog drum or other part or parts driven by the machine which has relatively very slow motion, thus making it impossible, in a practical manner, to increase or decrease the speed of the spindle or the feed or tool slide while the tools are cutting the workpiece.

The principal object, therefore, of this invention is to provide a speed change mechanism and control means therefor, which will have general application, but when applied to machine-tools permits the changing of speed while the feeding or cutting movements of the slide or slides of the machine is taking place, and permits this change of speeds under the control of the dog drum of the machine or manually while the dog drum is rotating very slowly, and permits of increasing or reducing the speed while the work on the spindle head is being cut or is being otherwise operated upon by the tools; and, furthermore, permits of establishing changes of speeds of very short duration or of as long duration as desired.

More specifically the objects of this invention embrace the provision of electro-pneumatic means—including a shiftable member for shifting clutches of a change speed mechanism—wherein, whenever said member has been shifted to a predetermined position to change the adjustment of a coupling or clutch of the change speed mechanism, the air pressure is relieved, thus reducing wear and friction of the connecting parts and minimizing heating of the parts and extending their service life.

Another object of this invention is to provide control mechanism for change speed mechanism, of the character above mentioned, and incorporating safety cut-out devices which operate automatically to stop the machine whenever the control mechanism has failed within a pre-established period of time to properly complete an attempted engagement of a coupling or clutch of the change speed mechanism, and thus preventing the wear, friction, heat and damage to the coupling or the burning out of the clutch plates which otherwise would tend to take place.

A further object of this invention is to provide an electro-pneumatic control for change speed mechanisms and which control is simple, light, or delicate in its functional operation yet durable and of small size, and is convenient to install, in a machine, and one which is quick, positive and reliable in response and in operation.

All the objects of this invention will be in part obvious and in part pointed out hereinafter.

In accordance with the objects of the present invention, said invention is concerned particularly with means for moving a throw lever (or equivalent part) of a clutch or clutches whereby either clutch may be engaged selectively or both clutches may be disengaged, and wherein said throw lever is shifted by means of a piston connected to the throw lever and displaced by means of pressure through the agency of solenoid operated valves which are controlled by electrical switches and circuits which are preferably under the control of switch operating dogs on the dog drum of the lathe, or which may be arranged to be operated manually. This arrangement is such that, during normal operation of the machine, the dogs selectively operate one of a series of switches, and the circuits thereof being such, that, when one of these switches is operated by one of the dogs, a circuit will be established which will energize one of the solenoid valves to admit pressure to one side of the piston and cause the throw lever to be shifted in one direction to engage one of the clutches. Similar actuation of another of said switches establishes a circuit which energizes a second solenoid valve to admit pressure to the other side of the piston and cause said throw lever, or another throw lever, to be shifted to engage the other clutch. Means are provided in the circuits whereby, in the event that the throw lever has not been shifted sufficiently to properly complete the attempted engagement of one of the clutches, after a certain predetermined length of time, the power source or a driving motor (which drives the change speed mechanism) will be broken and the machine will be stopped. Also, actuation of still another, at least, of said switches, either by dog drum or by hand, will reset the control of the present invention to allow the machine to be started, after having been stopped as just stated; and this same actuation of said switch will cause said clutches to be disengaged. Moreover, the arrangement is such that, when a clutch is properly engaged, whether or not a clutch controlling dog on the dog drum has released its switch, the circuit will be broken to the energized solenoid valve and the pressure will be relieved while the clutch is still engaged. Other safety and operational features are also included as will be described in detail hereinafter.

The invention accordingly consists in the features of construction, arrangement of parts, combinations of elements and methods of operation which will be pointed out hereinafter and the scope of the application of which will be set forth in the claims that follow.

In order that a clearer understanding of this invention may be had attention is hereby directed to the accompanying drawings forming a part of this application and illustrating certain possible embodiments of this invention and in which—

Figure 1 is a sectional view through the headstock of a turret lathe illustrating a change speed mechanism to which the control mechanism of this invention may be applied;

Figure 2 is an enlarged sectional fragment of the overrunning gear and is taken on line 2—2 of Fig. 1;

Figure 4 is a side view partly in section of one of the solenoid operated air valves.

Similar reference characters refer to similar parts throughout the several views of the drawings.

Figure 3:
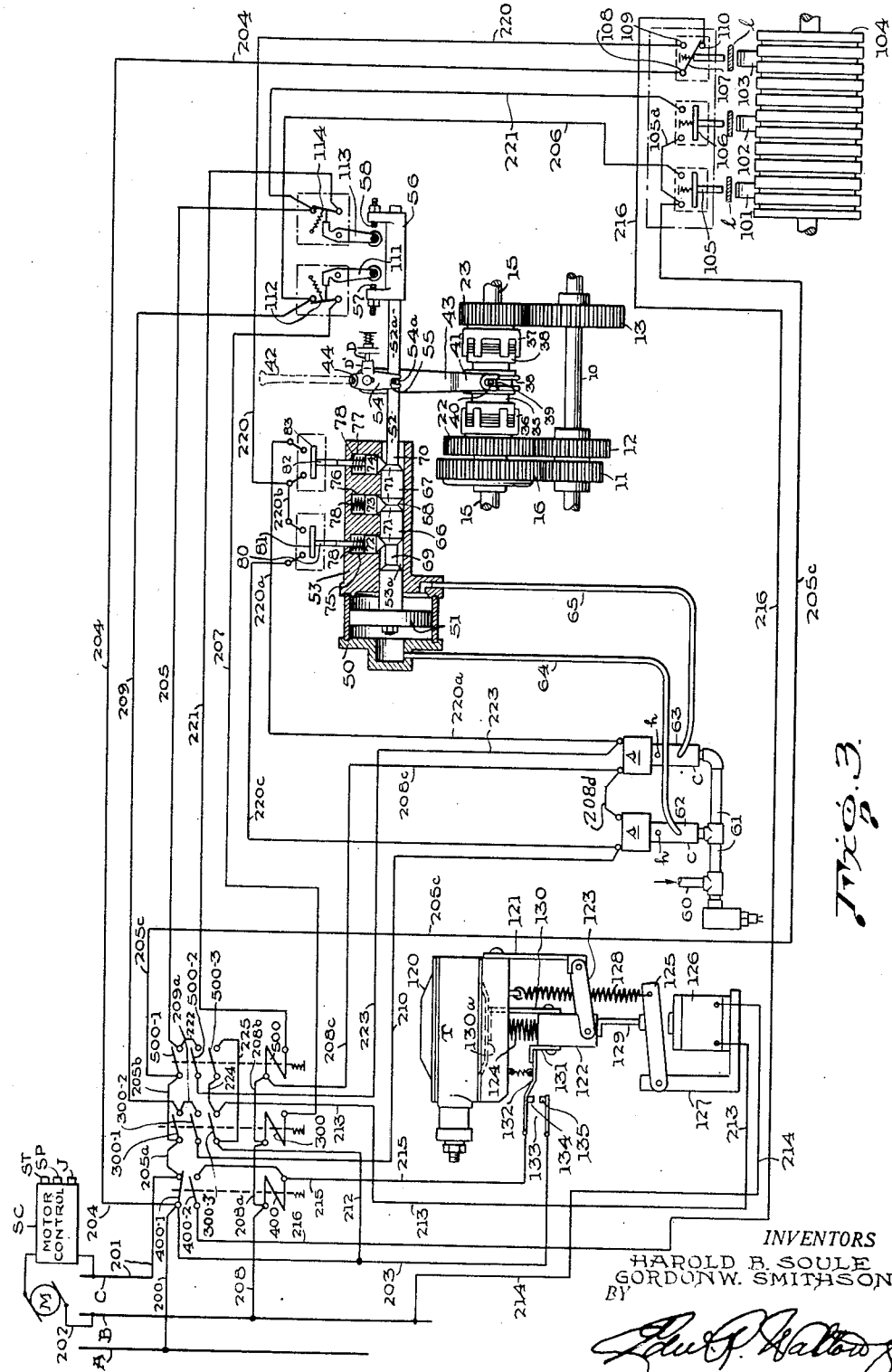
Figure 3 is a diagrammatic or schematic view of the electro-pneumatic clutch control mechanism and electrical circuits associated therewith, and shows the air cylinder in section and a portion of the change speed mechanism of the lathe, and also a representation of an associated timer device.

Referring to the drawings, the change speed mechanism shown includes a driving shaft 10 on which are keyed a low speed gear 11, a medium speed gear 12 and a high speed gear 13. Shaft 10 also has a driving pulley 14 whereby the shaft may be driven by a suitable motor indicated diagrammatically in Fig. 3 at M. Another shaft 15 has keyed to it a gear 16 of the overrunning type well known in the art; but for clarity it may be stated that, with reference to Fig. 2, the gear 16 has an inner sleeve 16a keyed to the shaft 15 and fixed to an inner circumference of the gear are circumferentially spaced tapering wedge members 17 and forming with the sleeve 16a circumferentially tapering slots 17a in which are seated rollers 18 which are normally pressed by means of springs 19 toward the smaller end of the slots, the socket type follower 20 being interposed between each roller and spring and the part 16b being a hardened wear ring fixed on the sleeve 16a. Thus, when gear 16 is rotating in the direction of the arrow applied to Figure 2, the rollers 18 become wedged in the slot between the members 17 and the wear ring 16b on sleeve 16a and shaft 15 rotates with gear 16. On the other hand, when shaft 15 tends to rotate in the direction of the arrow faster than gear 16, the engagement of the shaft 15 with rollers 18 will move the rollers toward the wider end of the slot against the tension of the springs 19 and thus shaft 15 is released to rotate in the direction of the arrow relatively to and faster than gear 16. Gear 16 is in constant mesh with low speed gear 11 and continues to rotate when shaft 15 is rotating at its intermediate or high speed.

Rotatable on shaft 15 are a gear 22, which is in mesh with medium speed gear 12, and a gear 23, which is in mesh with high speed gear 13. Also the shaft 15 has a gear 24 keyed thereto and through which power is taken off of shaft 15 as by a gear 25 keyed to a shaft 26 which also has another gear 27 keyed thereto which meshes with a gear 28 on a shaft 29 having another gear 30 keyed thereto and which meshes with a gear 31 fixed on the spindle 32. A gear 33 meshing with a gear 34 keyed on shaft 26 takes power from shaft 26 to drive the feed shafts (not shown) that actuate the turret slide 47, cross-slides 48 (Fig. 1) and the dog drum or wheel 104 (Fig. 3), the connections to which parts not being shown.

On shaft 15 between the gears 22 and 23 is keyed a clutch sleeve, cone sliding part 35 disposed between double clutches 36 and 37 rotatable on the shaft 15 so as to alternately engage one of said clutches and disengage the other or assume a neutral position disengaging both. The clutches 36 and 37 are fixed, respectively, to gears 22 and 23 to rotate therewith. Intermediate the clutch sleeve 35 is a circumferential channel track 38 in which rides a shoe 39 having outwardly extending diametrically opposite projections 40 that are engaged by the arms of a yoke 41 formed on the lower end of a clutch throw lever 43 which is keyed to and supported by a shaft 44, which may be oscillated by a hand-lever 42 (dotted lines Fig. 3) to actuate the clutch-sleeve 35.

When throw lever 43 is in its central or neutral position, as shown, neither of the clutches 36 or 37 is engaged and therefor shaft 15 and, consequently, spindle 32 are driven at low speed through gears 11 and 22. When throw lever 43 is shifted to move sleeve 35 to the left, clutch 36 becomes engaged and clutch 37 remains disengaged, which establishes a medium speed driving connection between gear 12 and shaft 15 through gear 22, clutch 36 and sleeve 35. When the throw lever 43 is shifted from neutral position to the right, clutch 37 becomes engaged and clutch 36 remains disengaged and a high speed driving connection is established between gear 13 and shaft 15 through gear 23, clutch 37 and sleeve 35. Shaft 15 over-runs gear 16 when these clutches are connected in the manner explained above. The clutches are held in engagement and the clutch sleeve or cone 35 is held in its neutral position by a yieldable dent D mounted on a fixed part of the machine and selectively engages in V-shaped notches spaced about a brushing, segment or other suitable part D' fast to and rotatable with the throw-lever shaft 44.

In the drawings the head of the spindle 32 is shown as carrying a chuck 45 and there is also indicated schematically a turret 46, a turret slide 47 and a cross slide 48, all mounted on the bed or base 49 of the lathe.

The above described spindle drive is old in the art and is referred to for an understanding of the present invention wherein the clutch shifting or shipping mechanism is pneumatically operated and controlled in the manner now to be explained.

This pneumatic means for shifting a clutch or clutches through lever 43 includes an air cylinder 50 supported in any suitable manner and in any suitable location on the machine or base of the lathe. Within the air cylinder is a piston head 51 from which an elongated piston rod 52 extends through a suitable bore 53a provided therefor in a block 53 which extends from one end of cylinder 50. Beyond the block 53, the piston rod 52 is connected to throw lever 43 so that shifting of piston rod 52 will shift the throw lever 43 in the same directions. For purposes of the present illustration, the piston rod 52 has a pin 55 that projects into a notch or bifurcation 54a in an arm 54 fast on the shaft 44 to which the throw-lever 43 is fast. Piston rod 52 extends beyond throw lever 43, as at 52a and there is provided with a bracket 56 carrying a pair of spaced adjustable set screws 57 and 58 for a purpose which will be explained hereinafter.

The piston is reciprocated in the cylinder by air pressure delivered from a suitable source, indicated at 60, and from which a conduit 61 leads to two (2) solenoid valves 62 and 63. An air pipe 64 leads from valve 62 to the cylinder at one side of the piston head 51 and an air pipe 65 leads from valve 63 to the cylinder at the opposite side of piston head 51.

Each of these valves 62 and 63 comprises an elongated casing c (see Fig. 4) having an opening in its lower end which receives a threaded nipple on the main air supply line 61. The interior of the valve casing c is divided by a partition p having a bore b therein longitudinally of the casing and at the ends of the bore are provided valve seats d and e. A plunger f reciprocates in and is of less diameter than said bore and has a valve d' fast thereon to cooperate with the seat d and has on its other end a valve e' slidable thereon and normally held against the seat e by a spring g, the valve e' being opened by the plunger F, when contacted by the shoulder f' in its downward movement moving it against the bias of the spring g, and allows air-pressure to flow from supply line 61, past valve seat e to outlet port o. There is an exhaust port h in the side of the casing above the valve d'. The solenoid s is mounted on the top of the valve and the plunger s' thereof depresses the plunger f, when the solenoid is energized, and raises it to full line position, when the solenoid is de-energized.

An electrical control means is provided for operating these solenoid valves to move the piston 51 to predetermined positions in its cylinder 50 and thus to adjust the clutches 36 and 37 accordingly. As part of this control the portion of the piston 52, which is disposed within the block 53, has two (2) axially spaced portions 66 and 67 (preferably of a diameter substantially the same as the diameter of the bore), upon which ride the ends of spring pressed plungers 72, 73 and 74. Between the portions 66 and 67 the rod has an annular reduced portion or groove 68 of a width only to receive the end of the plungers 72, 73 and 74 and its location corresponds to the intermediate position of the piston head 51 or the neutral position of the clutch-sleeve 35. The length of the portions 66 and 67 corresponds to the movement of the piston-head 51 from neutral position, in either direction, to fully engage either clutch 36 or 37 and, as shown, the length of portions 66 and 67 are about equal. The portions 69 and 70 of the rod 52 are of less diameter than the diameter of the portions 66 and 67 and are of a width or length axially of the piston rod 52 so that plungers 72, 73 and 74 will not be depressed thereby. Both end walls of the portions 66 and 67 are beveled as at 71. The three (3) plungers 72, 73 and 74 are disposed in three (3) recesses 75, 76 and 77 formed in the interior of the block and in axial alignment with the rod 52 and opening into the bore 53a and are individually biased to move into the bore by springs 78 which are positioned between the rear faces of the plungers of the interior wall of the recesses. These plungers are so positioned relatively to the enlarged portions 66 and 67 of the piston rod that, when the piston head 51 is at the center of the cylinder 50 and the clutch-sleeve 35 is in its neutral position, the plungers project into the bore with the conical head of plunger 72 resting against the outer beveled end of portion 66 which is at the groove 69 and with the conical head of plunger 73 seating against the adjacent beveled ends of portions 66 and 67 at the groove 68 and with the conical head of the plunger 74 resting against the outer beveled end of portion 67 at groove 70. In this position of the piston the throw lever 43 (and the hand-lever 42) of the clutches will be in neutral position and neither clutch 36 or 37 will be engaged.

A switch stem 80, having a switch contact element 81, extends through a suitable bore in the block 53 and is fixed to plunger 72 and a similar switch stem 82 having switch contact 83 extends through a bore in block 53 and is fixed to plunger 74. When the piston is shifted from central position to the left, portion 66 of the piston rod moving under plunger 72 elevates this plunger and closes the switch 81 and, since the reduced portion 70 of the piston rod 52 moves under plunger 74, this plunger is not raised. On the other hand, when the piston is moved from central position to the right, enlarged portion 67 of the piston rod passes under plunger 74 raising this plunger and closing switch 82, but groove 69 of the piston rod is sufficiently wide so that during this movement the reduced portion 69 remains under plunger 72 and this plunger is not raised. Plunger 73 serves merely as a detent to aid in restraining inadvertent displacement of the piston rod and to aid in holding the piston rod in central or neutral position.

As shown, the circuits which control the operation of the solenoid valves 62 and 63, and, consequently the air piston 51 and thereby the speed change settings of the change speed mechanism, are under the control of three dogs 101, 102 and 103 carried on the rotatable dog drum, wheel or other movable parts of the lathe and which is indicated at 104 (Fig. 3). Dogs 101 and 102 are adapted respectively to close normally open switches 105 and 106 at predetermined times in accordance with the placement of these dogs on the dog drum. Dog 103 operates a switch 107 to close one circuit between its normally open terminals 108 and 109 and to break another circuit between normally closed terminals 108 and 110.

When the air piston rod 52 has been moved a sufficient extent to the right from its neutral position to properly engage clutch 37, the set screw 57 on bracket 56, carried on piston rod 52, has moved sufficiently to engage and move a pivoted switch lever 111 to open a normally closed switch 112 and, when the piston rod 52 has been moved a sufficient extent to the left to properly close clutch 36, the set screw 58 carried on the bracket 56 has moved sufficiently to engage and move the pivoted switch lever 113 to open normally closed switch 114. Either switch 112 and 114 remaining closed unless and until the piston rod 52 has been shifted a sufficient distance in one direction or the other to properly close one of the clutches 36 or 37.

The control circuit for the solenoid valves also includes an electrically triggered timer T which may be any one of a number now available on the market, the particular type or construction not being important but should be such that it is started by the closing of a circuit thereto and, after running for the time for which it has been pre-set, it will act to operate an element, such as an electrical switch, controlled by the timer, and further should be such that, should the current to the timer be broken before the timer has completed its time cycle, the timer will stop and will reset itself without acting to operate the element controlled by the timer. When the circuit to the timer, therefore, is closed again the timer will start again to run for its complete time period before acting.

To present a general indication of such a timer and how it is included in the change speed control circuits, there is shown in Fig. 3 of the drawings a timer with a casing 120 having secured thereto a bracket 121 to which a block 122 is connected by swinging arms 123 for vertical reciprocation beneath the casing. A spring 124 compressed between the casing 120 and the top of block 122 exerts downward pressure on the block. Beneath block 122 a vertically swinging armature 125 of an electromagnet 126 is pivoted on a bracket 127 and a tension spring 128 connected to casing 120 and armature 125 exerts upward pull on the armature. The force of spring 128 is stronger than the force of spring 124. An upwardly extending post 129 on armature 125 is in the path of movement of block 122 and not only determines the limit of downward movement of block 122 but also moves block 122 upwardly, when the armature 125 is raised by spring 128, while block 122 is resting on post 129. When magnet 126 is energized, it draws armature 125 and its post 129 downward against the opposition of springs 128, thus relieving block 122 from the upward pull of spring 128 and allowing block 122 to be moved downwardly by the force of spring 124. However, a finger 130, secured to block 122 and extending into casing 120, is connected to some suitable dashpot arrangement, or other movement retarding means within the casing, such as the diaphragm 130a, which determines and controls the rate of downward movement of block 122, when free of post 129. A finger 131 on block 122 is in engagement with a spring terminal finger 132 of a switch 133. When armature 125 is in its elevated position (as shown) holding block 122 elevated, switch 133 is open. Energizing the magnet 126 will draw armature 125 down and, when block 122 has been moved down a predetermined distance by spring 124, it will close the switch terminal 134 of the spring switch finger 132 against the other terminal 135 of the switch 133, thus closing the switch. Should magnet 126 become deenergized before block 122 has moved a sufficient distance downwardly to close switch 133, the armature and the block 122 will immediately be raised by the force of spring 128 to their initial starting position. The time cycle of the timer is the time it takes for the block 122 to move downwardly under the restraint of the retarding means 130a from initial starting position to switch 133 closing position. The time obviously is adjustable by adjusting the rate of downward movement of block 122 or the extent of movement between starting and switch closing elevations, or both. The timer just described is one of a type known on the market as "Type R Timer of the Square D Company," but any suitable timer of the same or substantially the same function may be employed, as, for instance, as another example, a timer relay of the electronic type.

The spindle drive motor is designated M in Fig. 3 of the drawings. Motor M drives the shaft 10 of the change-speed mechanism by means of a suitable driving connection (not shown) between the motor shaft and the pulley 14 (Fig. 1) on shaft 19. The power supply lines are indicated A and B and the spindle motor M is in lines B and C, line C being connected with line A through a conductor 200 which leads to a normally closed switch 400—1 and from thence to a conductor 201 connected with line C. An electrical spindle motor control is generally indicated in the line C and designated SC and includes start, stop and jog push-button switches, indicated by ST, SP and J, respectively; and the other side of the motor is connected to power line B by conductor 202.

Switch 400—1 is included in the clutch shifting control circuits and it is apparent that this switch opens and closes the power circuit to the motor M and is provided for safety and protective purposes as will become apparent hereinafter.

Figure 3 illustrates the setting of the parts and the conditions of the circuits when the clutches 36 and 37 are disengaged or, in accordance with the present illustration, when the spindle of the lathe is being driven at low speed by shaft 15 and through the over-running gear 16; and in this setting the head 51 of the air piston is in its intermediate or neutral position in air cylinder 50, the clutch throw lever 43 is in its intermediate or neutral position, and spindle motor control switch 400—1 is closed. The circuits are not closed to either of the solenoids of solenoid valves 62 or 63 or to the magnet 126 of the timer T referred to above.

The change-speed mechanism is automatically shifted to drive the spindle at high speed upon the closing of switch 105 manually or by the dog 101 provided on dog drum 104 for the purpose, or may be shifted to establish medium speed spindle rotation by the closing of switch 106 manually or by the dog 102 on dog drum 104, and said mechanism can be restored to neutral position, as in the present case, for low speed rotation from either medium or high speed position by operating switch 107 manually or by dog 103 of dog drum 104. The switches 105, 106 and 107 may be manually operated by finger-lift rods or levers interposed between the dog drum and the switch stems, as generally indicated at l.

Therefore, closing speed switch 105 completes a circuit from power line A through conductor 200, switch 400—1 and conductors 205a, 205b and 205c to switch 105 and therefrom through conductor 206, switch 112, conductor 207, relay 300 and conductors 208a and 208 to power line B. Relay 300, when energized, closes an interlock or holding switch 300—1 thereby connecting conductors 205a and 209 establishing a holding circuit for relay 300, the current passing from line A through conductor 200, switch 400—1, conductor 205a, switch 300—1, conductor 209, normally closed switch 112, conductor 207, relay 300 and conductors 208a and 208 to power line B. Energizing relay 300 also closes a second switch 300—2 thus energizing the solenoid of solenoid air valve 62, the current passing from power line A through conductor 200, switch 400—1, conductor 205a, switch 300—1, conductor 209a, switch 300—2, and conductor 210 to the solenoid of valve 62 and thence through conductors 208d, 208c, 208b and 208a and 208 to power line B. Energizing relay 300 also closes a third switch 300—3 which closes a circuit to the magnet 126 of the timer above referred to, the current passing from the line A, conductors 200, 203 and 212 through switch 300—3 and conductor 213 through the magnet coil 126 to the conductor 214 to line B. This starts the timer running by drawing the magnet armature 125 and its post 129 downwardly from the timer block 122 and allows the spring 124 to start moving block 122 downwardly at the speed permitted by the retarding device 130a provided in the casing 120.

The energizing of the solenoid of valve 62 causes air to be delivered through conduit 64 to the left hand side (in Fig. 3) of piston head 51 and displaces piston rod 52 to the right, whereupon the enlarged portion 67 of the piston rod 52 moves under the plunger 74 and raises the stem 82 of switch 83 to close it. This conditions a circuit which will cause the air cylinder and throw-lever 43 to be returned to neutral or clutch disengaging position upon the throwing of switch 107 from terminal 110 to its terminal 109 as will be more fully described hereinafter. As a result of the above operation, if piston rod 52 has moved a sufficient distance to the right to cause clutch 37 to be properly engaged, the set screw 57 on the bracket 56 carried on piston rod 52 will have moved a sufficient distance to open the switch 112 to de-energize relay 300 and this, in turn, causes its interlock switches 300—1, 300—2 and 300—3 to open. Opening of relay switch 300—3 breaks the circuit to the timer T and the timer resets itself to initial starting position in the manner above stated. Opening of relay switch 300—2 breaks the circuit to the solenoid of valve 62 and effects the release of air pressure from the air cylinder 50 through exhaust port h. The opening of relay switch 300—1 breaks the holding circuit that was previously established through relay 300. The clutch 37 is now engaged and the piston 51 is at right-hand end of cylinder 50, from which positions they may be operated by admitting air from pipe 65 to the right-hand side of piston 51 by closing speed switch 106 that will cause clutch 37 to be disengaged and clutch 36 engaged, or by closing contacts 108 and 119 of neutral switch 107 to disengage both clutches 36 and 37, as will be later explained.

It will be noted, however, that set screw 57 is so adjusted on piston rod 52 that unless the rod 52 is shifted far enough to establish the proper engagement of clutch 37, switch 112 will not be opened thereby and the circuit to the timer magnet 126 will not become broken because relay 300 will remain energized. In such event, the timer T will continue to run and, after running for the pre-determined time for which it is set (which is usually sufficient to allow for the operation of the engagement of the clutches), it will close the switch 133. The closing of switch 133 of timer T establishes a circuit through a safety relay 400, the current passing from power line A through conductors 200 and 203 to terminal 135 of switch 133 and from terminal 134 of this switch through conductor 215 through relay 400 and conductor 208 to power line B. The energizing of relay 400 opens the motor control switch 400—1 and causes the motor M to stop. Energizing relay 400 also closes an interlock or holding switch 400—2 which maintains a holding circuit through the relay 400; the current passing from power line A through conductors 200 and 204 to the terminal 108 of neutral switch 107 and thence from the terminal 110 of this switch through conductor 216, through switch 400—2, conductor 215, relay 400 and conductor 208 to the other power line B. Now, the spindle motor M—and in most cases where it is contemplated using this invention the entire machine is stopped—can only be restarted by deenergizing relay 400 to reset or close normally closed interlock switch 400—1.

The restarting of the machine or motor M can be accomplished manually by operating finger-lift lever l of neutral and resetting switch 107 or by dog 103 of the dog drum 104, as, when hand-cranking, to move neutral switch 107 from its contact 110 to close switch contact 109 which breaks the circuit to relay 400 and deenergizing it, thus causing the motor circuit control switch 400—1 to close re-establishing the circuit to the motor M and causing said relay holding switch 400—2 to open. Closing of switch 107 on contact 109 energizes the solenoid of air valve 63, the current passing from power line A through conductors 200 and 204 to terminal 108 of neutral switch 107 and from its terminal 109 through conductor 220, through closed conditioning switch 83, conductor 220a to the solenoid of valve 63 and from thence through conductors 208c, 208b, 208a and 208 to the other power line B. Energizing the solenoid of valve 63 causes air under pressure to flow through air conduit 65 to the right hand side of the piston head 51 and moves the piston rod 52 to the left. When the piston rod has arrived at neutral position the plunger 74 rides off the enlargement 67 of the piston rod into the reduced portion 70 and thereby moves inwardly opening switch 83, thus breaking the circuit to the solenoid of air valve 63, whereupon the valve becomes adjusted to relieve the right hand side of piston head 51 of the air pressure by exhausting through exhaust port h and the piston rod, the clutch sleeve 35 and throw lever 43 stop in neutral positions.

The operation for adjusting the speed of the change-speed mechanism to medium speed is similar to that, which has been described, for adjusting the speed mechanism to high speed, except that the medium speed adjustment involves speed switch 106, which may be closed manually or by dog 102 on the dog drum 104, and also involves relay 500, the conditioning switch 114 controlled by switch lever 113 actuated by set screw 58 on the piston rod bracket 56, the piston rod actuated switch 80 and the energizing of the solenoid of air valve 63 to move the piston rod 52 to the left for shifting the throw lever 43 to the left and thereby to engage clutch 36, meanwhile closing switch 80. Relay 500 is energized for the same purposes as is the high speed relay.

The circuit which energizes relay 500, when speed switch 106 is closed, now includes power line A, conductor 200, switch 400—1, conductors 205a, 205b, 205c and 205d to switch 106 and, from this switch, conductor 221, switch 114, conductor 221a to a relay 500 and, thence, through conductors 208b, 208a and 208 to the other power line B. Energizing relay 500 closes an interlock switch 500—1 which closes a holding circuit to the relay 500 through conductor 200, switch 400—1, conductors 205a, 205b, switch 500—1, conductor 205, switch 114, conductor 221a, relay 500 and conductors 208b, 208a and 208 to the other power line B. Thus, relay 500 will remain energized after the dog 102 of the finger-lift lever l or dog 102 has released switch 106 and this switch has become opened. Relay 500, when so energized, also closes a switch 500—2, which energizes the solenoid of air valve 63 to deliver air under pressure to the right side of piston head 51 and shift the piston to the left to engage clutch 36, this circuit comprising conductor 200, switch 400—1, conductors 205a, 205b, switch 500—1, conductor 222, switch 500—2, conductor 223 which leads to the solenoid of valve 63 and from thence the current passes through conductors 208c, 208b, 208a and 209 to the other power line B. Energizing solenoid 500 also closes a third switch 500—3, the closing of which energizes the magnet 126 of the timer T. Switch 500—3 is connected by conductors 224 and 225 to be in parallel with conductors 212 and 213 of the timer control switch 300—3, mentioned above in connection with the high speed control, and the effect on the timer T by the closing of switch 500—3 is the same as the effect upon the timer by closing of switch 300—3; and the closing of either of these switches causes the timer to start running.

If the piston has been shifted sufficiently to make a complete engagement of clutch 36, the set screw 58 will have moved far enough to open switch 114, thus breaking the holding circuit to relay 500, causing it to be de-energized, thereby opening switches 500—1, 500—2 and 500—3 and breaking the circuit to the timer T and de-energizing valve 63 and has the same effect on the timer circuit as the opening switch 112 had on the timer circuit and the air valve 62.

In the meanwhile, the enlarged portion 66 of piston rod 52 will have ridden under the plunger 72 of switch 81 and will have closed this switch. Should the piston 51 not be shifted far enough to cause a complete proper engagement of the clutch 36, the set screw 58 carried on the piston rod will not have moved far enough to open switch 114 and, therefore, the circuit to the timer T will continue closed and the timer will continue running until it has run sufficiently long to close the switch 133, which upon closing will cause the energization of relay 400 and the opening of the motor circuit switch 400—1 in the manner previously described.

In the event there was a proper engagement of the clutch and the timer T did not energize safety relay 400, there is no need of resetting or closing switch 400—1 by breaking the holding circuit through relay 400 by opening contacts 108 and 110 of neutral switch 107 (as this circuit is already open at 400—2); and the next operation could be the closing of speed switch 105 to shift clutch throw lever 43 to disengage clutch 36 and engage clutch 37, whereby the operation will be the same as above described; or the next operation could be the closing of contacts 108 and 109 of neutral switch 107 to effect movement of the piston 51 and the clutch throw-lever 43 to neutral position. The latter operation of neutral switch 107 completes a circuit to the solenoid of valve 62 to cause the valve to deliver air to the left hand side of the piston head 51, the circuit being from power line A through conductors 200, 204, to switch terminal 108 and from switch terminal 109 through conductors 220 and 220b, switch 81, conductor 220c to the solenoid of valve 62 and thence through conductors 208d, 208c, 208b, 208a and 209 to the other power line B. When the piston arrives at neutral position plunger 72 snaps off of the enlargement 66 on piston rod 52 and switch 81 opens, breaking the circuit to the solenoid of valve 62 and thus de-energizing the solenoid and relieving the cylinder of air pressure through exhaust h. In the meantime contacts 108 and 109 of neutral switch 107 will have been opened.

From the above, it is seen that pneumatic means are provided functioning under switch controlled electric circuits to adjust either of the two clutches of any change speed mechanism and, particularly in lathes, to establish or disestablish the corresponding spindle speed or to disengage both clutches to establish the drive through the gears 11 and 16, all at such times and in the sequences desired, and either by the manual operation of switches in the circuits or by operation of those switches by dogs carried on the dog drum or wheel of the machine.

For instance, and assuming that the main starter switch ST of the spindle motor circuit has been operated, when the clutch throw lever 43 is in neutral, the drive continues through low speed gears 11 and 16 until either high speed switch or low speed switch is closed. The closing of either of these switches operates the corresponding solenoid valve 62 or 63 to operate the air cylinder piston to throw the clutch lever in the corresponding direction, the closing of high speed switch 105 resulting in throwing the clutch lever to the right and establishing the speed drive through gears 13 and 23 and the closing of speed switch 106 resulting in throwing the clutch lever to the right and establishing another speed drive through gears 12 and 22 and, when either of these speeds have been properly established, this establishment of the speed automatically releases the air pressure from the clutch which otherwise will be held in engagement by detent D, or its equivalent, until again released by air pressure. Should the throw of the clutch lever 43 not be sufficient to establish a full engagement of either clutch attempted to be engaged, the motor M will be stopped automatically after a predetermined length of time by the action of the timer T and all air pressure in the air cylinder 50 is automatically released therefrom. After a spindle drive or motor stoppage, due to a failure to complete an attempted clutch engagement, the drive or motor may be restarted by operating switch 107 either manually or by a dog 113 on the dog drum. Also by operating this switch 107 the clutch lever (or other clutch actuating part) may be caused to shift from either speed drive through either clutch 36 or 37 to a neutral position or, as in the present showing, to a low drive adjustment while the spindle motor M is driving the change speed mechanism and the spindle. According to the application of the invention as herein shown, the shift of the clutch lever may be also from a higher to a medium or from medium to high, or from either medium or high to a still lower speed, or from the lower speed to either high or medium speed.

The simplicity, positiveness and safety of the control is apparent from the above description. With such a control for change-speed mechanism applied, as depicted herein, the speeds of the spindle of a lathe may be changed while the workpiece is being operated on by the tools of the machine despite the fact that the dog drum is necessarily rotated very slowly and the length of time during which the change-speed switches 105, 106 or 107 remain closed may be longer than the time required of the shipping of the clutches. Also upon the proper engagement of either of the clutches or upon the return of the clutch throw lever to neutral position the air pressure becomes dissipated from the air cylinder, thus reducing to a minimum the wear on the clutch yoke and the heating of the parts. The automatic stopping of the spindle drive or machine motor whenever an attempted engagement of either of the clutches does not take place properly within the predetermined running time of the timer avoids wear on the clutches which would take place should the driving member of the clutch continue to rotate with a partial engagement with the driven clutch member. Further, it is apparent that, with the control described, it is possible to arrange for speed-changes of very short duration or for as long a period as desired. Other improvements and advantages will be readily apparent from the above to those skilled in the art.

Although certain specific embodiments of the invention are shown and described, it is obvious that many modifications thereof are possible. The invention, therefore, is not to be restricted except insofar as is necessitated by the prior art and by the spirit of the appended claims. For instance, the invention is applicable to single throw clutches or single coupling devices as well as double throw clutches or couplings and is equally applicable to the change speed mechanism which effect changes in feed of machine tools.

That which is claimed, as new, is:

1. A combination with a power driven change speed transmission mechanism that is operated to effect change in speed by a power actuated shiftable member and wherein there is a controllable source of power for shifting said member, of a selectable control means connected with said shifting member to effect its shifting movements and comprising a device connected to said source of power and positioned to be actuated at a pre-determined time by the movement of the shiftable member, when the latter is actuated to properly effect a change of speed of said mechanism, to release the power from said shiftable member, an operative connection between said device and the controllable power source for shifting said member, a second device connected to the power source of the change speed mechanism and operable to disconnect the mechanism from its power source when during a predetermined lapse of time from the time of initial speed changing actuation of said device a change of speed of said mechanism has not been properly effected.

2. In combination with a speed change transmission mechanism that is operated to effect changes in speed by a shiftable member, a source of power for driving said mechanism connected thereto and a controllable power source for shifting said member connected thereto, a control means including initiating switches and electrical circuits therefor connected with said controllable power source for shifting said member; of an electrical switch element in the circuit of the initiating switch, which circuit effects movement of said member to change speed through said power source, said switch being positioned to be actuated at a pre-determined time by the movement of said shiftable member, when said change speed has been properly accomplished, to disconnect the controllable power source from said shiftable member, and a pre-set timer device in the circuit of said last mentioned initiating switch and set in motion thereby, said timer device including an operable means connected to the power source for driving said mechanism and to the controllable power source for shifting said member and actuated by the timer to disconnect said power source to the mechanism and the power source to said member.

3. A mechanism, as set forth in claim 2, further characterized by another of said initiating switches having a circuit connection to said operable means of the timer to maintain said operable means, when actuated by said timer, in its power disconnecting position and for releasing said operable means to move to power connecting position, when said switch is actuated.

4. A mechanism, as set forth in claim 2, wherein the speed change mechanism includes a plurality of coupling members and there being one initiating switch and circuit therefor for effecting engagement of each coupling, respectively, and an initiating switch for effecting disengagement of said couplings, said coupling disengaging switch having a circuit connection to said operable means to maintain the latter, when actuated by the timer, in its power disconnecting position and when said switch is in its normal inoperative position, said coupling disengaging switch, when initially actuated, releasing said operable means to reset position and closing a circuit to said shiftable member power source to move said member in coupling disengaging position.

5. A control means for change speed transmission mechanism, which mechanism includes clutches to be engaged for changing speed, means for driving said mechanism and a power source for said drive means, said control means comprising a shiftable member movable in opposite directions to alternately engage and disengage said clutches and having a neutral position, a power operated device to shift said member, electric circuits for operating said power device including initiating switches therein selectively operable to effect said operations of said member, two normally closed switches in the circuit of the initiating switches which effect engagement of said clutches and each positioned to be actuated, respectively, by said member, when moved in opposite directions to open its circuit and said member fully effects engagement of one of said clutches, a preset timer in the circuits of the initiating switches which cause engagement of said clutches and actuated thereby when either of said circuits is closed, a relay circuit controlled by the timer and a relay in said relay circuit operating a holding circuit controlling said power source to said drive means and to said power operated device, said holding circuit being operated by said timer to render said drive means and said power operated device ineffective when said power operated device fails to open said normally closed switches.

6. A control, as set forth in claim 5, wherein another of said initiating switches is in a holding circuit to said relay and normally maintains said circuit, when said holding circuit is operated by said timer, and breaks said holding circuit when actuated, whereby said holding circuit reestablishes power to said drive means of said mechanism and to said power device of said shiftable member.

7. In combination with a power driven change speed transmission mechanism that is operated to effect change in speed by a power actuated shiftable member and wherein there is a controllable source of power for shifting said member selectively to a neutral or to one or the other of two opposed operative positions, of a selectable control means connected with said shifting member to effect its shifting movements to neutral or operative positions, wherein the control means includes a pre-set timer, a connection between said control means and said timer for setting the timer in operation when said shiftable member is actuated to effect a change of speed of said mechanism, a power drive to said mechanism, and a power cut-off means actuated by said timer after a predetermined lapse of time, to cut off the power drive to said mechanism and to said controllable source for said shiftable member, when said shiftable member fails to actuate said device.

8. A control for a change speed mechanism, in which mechanism there is a change speed adjusting member shiftable into one position to establish a certain speed setting in said change speed mechanism and shiftable into a second position to establish a second speed setting in said change speed mechanism and shiftable into a third neutral position, and power means for driving the change speed mechanism, said control including, in combination, a power operated device connected to said change speed adjusting member and operable to shift said member to each of said three positions, a source of power for operating said power operated device, electrically operated control devices and electrical circuits therefor controlling the supply of power to said power means and to said power device, said circuits including control initiating switches therein whereby said control devices are operated to pass power from said power source to power means to drive said mechanism and to pass power to said power operated device to shift said change speed adjustment member to each of said three positions, said electrical circuits including safety switches therein to be actuated by said power operated device, when moved to its first and second positions, for relieving power from said power operated device, and a pre-set timing device connected in said circuits controlling said power operated device and set in motion by the initiating switches for the first and second positions of said power operated device, a power controller controlling power from said source to said power means that drives said mechanism and to said power operated device, said power controller being actuated by the timing device, after a pre-set time lapse and upon the failure of said power operated device to place said adjusting member properly in any of said first or second positions, to cut out said power to said drive means and to said power operated device.

HAROLD B. SOULE.
GORDON W. SMITHSON.

REFERENCES CITED

The following references are of record in the file of this patent:

UNITED STATES PATENTS

| Number | Name | Date |
|---|---|---|
| 2,234,463 | Brewer | Mar. 11, 1941 |
| 2,266,598 | Hale | Dec. 16, 1941 |
| 2,357,396 | Fuller | Sept. 5, 1944 |